US012613851B2

(12) United States Patent　　　(10) Patent No.: US 12,613,851 B2
Luo et al.　　　　　　　　　　　　(45) Date of Patent: Apr. 28, 2026

(54) METHOD, APPARATUS, DEVICE AND MEDIUM FOR PROCESSING TABLE DATA

(71) Applicant: Beijing Zitiao Network Technology Co., Ltd., Beijing (CN)

(72) Inventors: Zhanhong Luo, Beijing (CN); Mingtao Luo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 18/763,808

(22) Filed: Jul. 3, 2024

(65) Prior Publication Data

US 2025/0013622 A1　　Jan. 9, 2025

(30) Foreign Application Priority Data

Jul. 3, 2023　(CN) .......................... 202310807792.2

(51) Int. Cl.
*G06F 16/22* (2019.01)

(52) U.S. Cl.
CPC ................................ *G06F 16/2282* (2019.01)

(58) Field of Classification Search
CPC ............... G06F 16/2282; G06F 16/284; G06F 16/2379; G06F 40/14; G06F 16/27; G06F 16/273
USPC .......................................................... 707/812
See application file for complete search history.

(56) References Cited

U.S. PATENT DOCUMENTS

| | | | | |
|---|---|---|---|---|
| 7,827,219 B2 * | 11/2010 | Chowdhury | ........ | G06F 16/9027 707/899 |
| 10,437,923 B2 * | 10/2019 | Silk | .......................... | G06F 16/93 |
| 10,740,550 B1 * | 8/2020 | Bosworth | ........... | G06F 16/2282 |

\* cited by examiner

*Primary Examiner* — Hung T Vy

(74) *Attorney, Agent, or Firm* — Astute IP Law Group

(57) ABSTRACT

Embodiments of the present disclosure relate to processing method, apparatus, device and medium for data table. The method comprises: determining at least one target field corresponding to a preset data calculation formula; determining, in response to a data modification operation on a target table, a modification field corresponding to the data modification operation; determining whether the modification field belongs to the at least one target field; and determining that the preset data calculation formula meets a preset recalculation condition in case that the modification field belongs to the at least one target field, so as to perform a data recalculation process according to the preset data calculation formula.

17 Claims, 5 Drawing Sheets

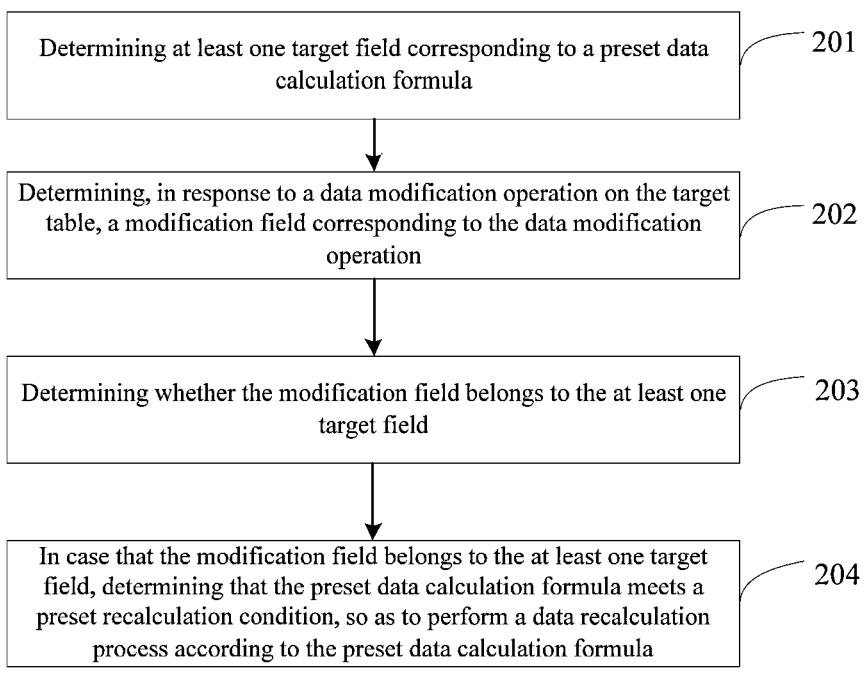

Determining at least one target field corresponding to a preset data calculation formula — 201

Determining, in response to a data modification operation on the target table, a modification field corresponding to the data modification operation — 202

Determining whether the modification field belongs to the at least one target field — 203

In case that the modification field belongs to the at least one target field, determining that the preset data calculation formula meets a preset recalculation condition, so as to perform a data recalculation process according to the preset data calculation formula — 204

Fig.2

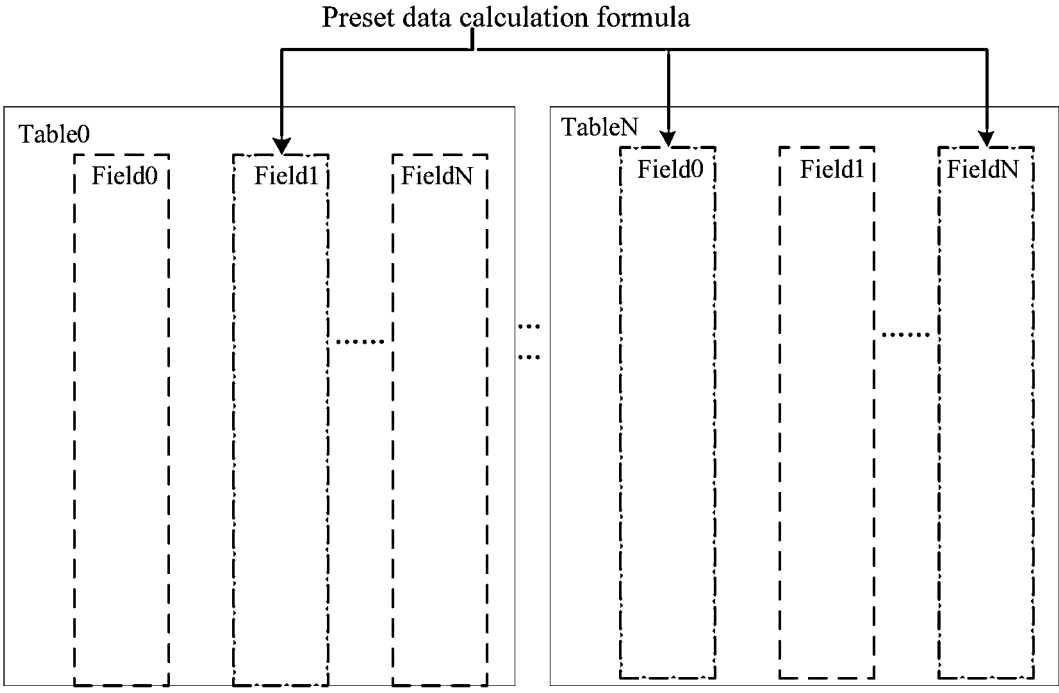

Preset data calculation formula

Table0
Field0   Field1   FieldN
......

TableN
Field0   Field1   FieldN
......

Fig.3

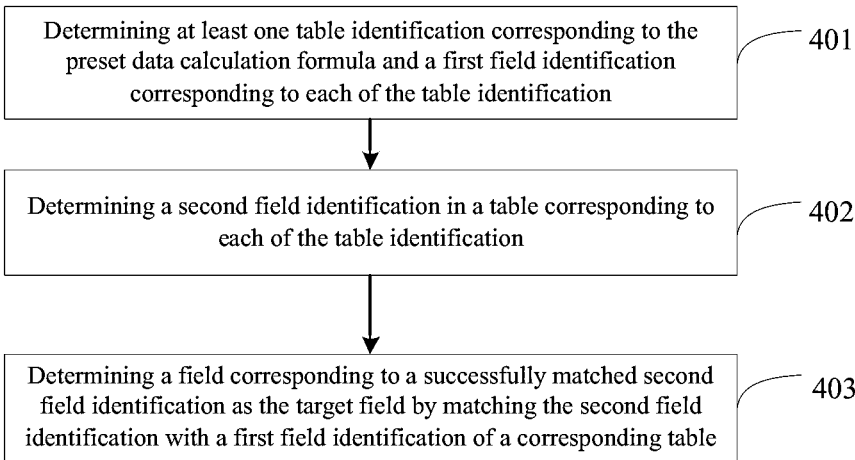

Determining at least one table identification corresponding to the preset data calculation formula and a first field identification corresponding to each of the table identification ⌐ 401

Determining a second field identification in a table corresponding to each of the table identification ⌐ 402

Determining a field corresponding to a successfully matched second field identification as the target field by matching the second field identification with a first field identification of a corresponding table ⌐ 403

Fig.4

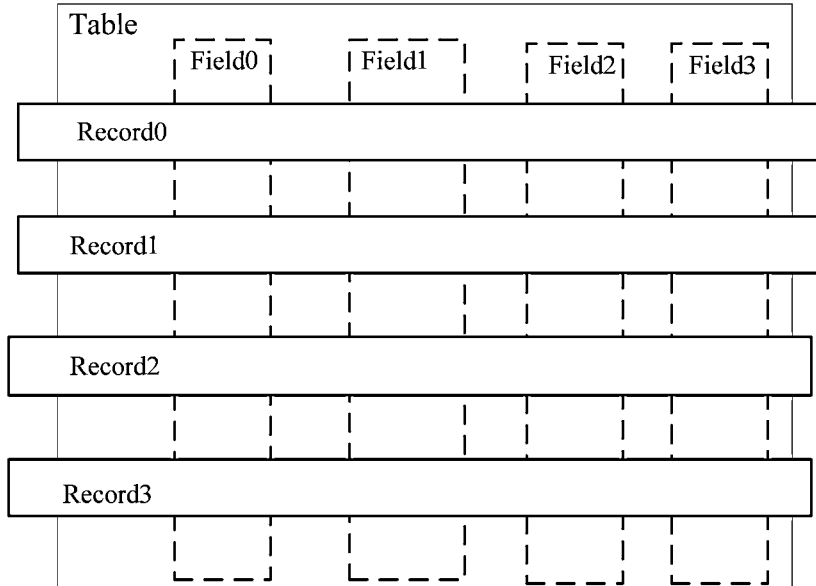

Fig.5

| | | Name | Grade | Student ID | Score |
|---|---|---|---|---|---|
| Student Table | | | | | |
| Statistical Table | Record 1 | Xiao Ming | Fourth Grade | 12345 | 99 |
| | Record 2 | Zhang San | Third Grade | 12346 | 87 |
| | Record 3 | Xiao Chen | Third Grade | 12389 | 88 |
| | Record 4 | Li Si | Third Grade | 34567 | 100 |

METHOD, APPARATUS, DEVICE AND MEDIUM FOR PROCESSING TABLE DATA

CROSS-REFERENCE TO RELATED APPLICATION(S)

This application claims priority to Chinese Application No. 202310807792.2 filed on Jul. 3, 2023, the disclosure of which is incorporated herein by reference in its entity.

FIELD

The present disclosure relates to the field of data processing, and more specifically, to a method, apparatus, device and medium for processing table data.

BACKGROUND

With the advance of computer technology, multi-dimensional tables with complex structure, such as collaborative database tables and the like, have become more pervasive. In order to satisfy scenario needs, nested computation of related data between database tables are more commonly dependent on calculation formulae. For example, as to the calculation formula A, related data in nested tables 1, 2 and 3 may be employed for computation.

SUMMARY

Embodiments of the present disclosure provide a method for processing table data. The method comprises: determining at least one target field corresponding to a preset data calculation formula; determining, in response to a data modification operation on a target table, a modification field corresponding to the data modification operation; determining whether the modification field belongs to the at least one target field; and determining that the preset data calculation formula meets a preset recalculation condition in case that the modification field belongs to the at least one target field, so as to perform a data recalculation process according to the preset data calculation formula.

Embodiments of the present disclosure also provide an apparatus for processing table data, comprising: a first determination module, configured to determine at least one target field corresponding to a preset data calculation formula; a second determination module, configured to determine, in response to a data modification operation on a target table, a modification field corresponding to the data modification operation; a third determination module, configured to determine whether the modification field belongs to the at least one target field; and a recalculation processing module, configured to determine that the preset data calculation formula meets a preset recalculation condition in case that the modification field belongs to the at least one target field, so as to perform a data recalculation process according to the preset data calculation formula.

Embodiments of the present disclosure further provide an electronic device, comprising: a processor; a memory configured to store instructions executable by the processor; wherein the processor is configured to read the executable instructions from the memory and execute the executable instructions to implement the method for processing table data provided by the embodiments of the present disclosure.

Embodiments of the present disclosure further provide a computer-readable storage medium, wherein the computer-readable storage medium stores a computer program, the computer program is configured to implement the method for processing table data provided by the embodiments of the present disclosure.

BRIEF DESCRIPTION OF THE DRAWINGS

Through the following detailed implementations with reference to the accompanying drawings, the above and other features, advantages and aspects of various embodiments of the present disclosure will become more apparent. Throughout the drawings, same or similar reference signs indicate same or similar elements. It is to be understood that the drawings are exemplary, in which original components and elements are not necessarily drawn to scale.

FIG. 2 illustrates a schematic flowchart of a method for processing table data provided by embodiments of the present disclosure;

FIG. 3 illustrates a schematic diagram of a further table structure provided by embodiments of the present application;

FIG. 4 illustrates a schematic flowchart of a further method for processing table data provided by embodiments of the present disclosure;

FIG. 5 illustrates a schematic diagram of a further table structure provided by embodiments of the present application;

DETAILED DESCRIPTION OF EMBODIMENTS

Figure 1:
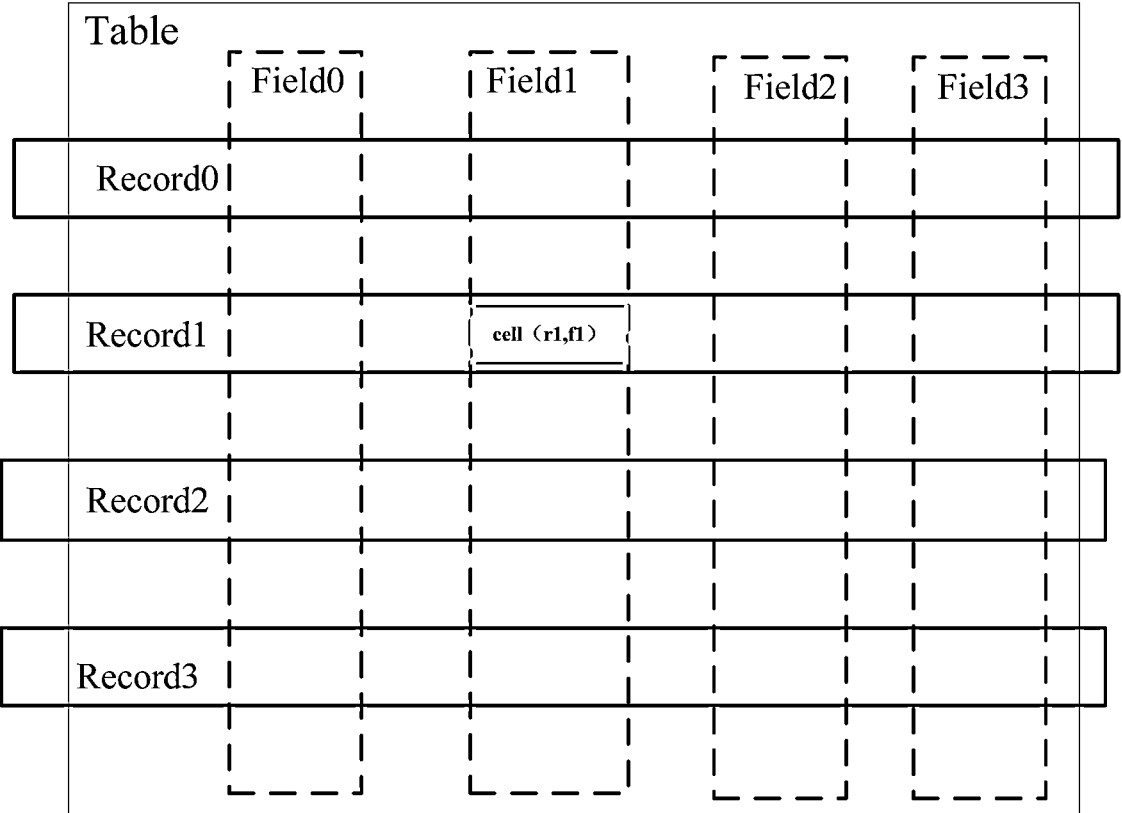
FIG. 1 illustrates a schematic diagram of a table structure provided by embodiments of the present application.

The embodiments of the present disclosure will be described in more details with reference to the drawings. Although the drawings illustrate some embodiments of the present disclosure, it should be appreciated that the present disclosure can be implemented in various manners and should not be limited to the embodiments explained herein. On the contrary, the embodiments are provided to make the present disclosure more thorough and complete. It should be appreciated that the drawings and the embodiments of the present disclosure are provided only for exemplary purpose, rather than restricting the protection scope of the present disclosure.

It is to be understood that respective steps disclosed in the method implementations of the present disclosure may be executed in different orders and/or in parallel. Besides, the method implementations may include additional steps and/or omit the demonstrated steps. The scope of the present disclosure is not restricted in this regard.

As used herein, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." The term "some embodiments" is to be read as "at least some embodiments". Related definitions of other terms may be provided in the following description.

It is to be noted that "first" and "second" are disclosed in the present disclosure merely for distinguishing different apparatuses, modules or units, rather than restricting the sequence of the functions executed by the apparatuses, modules or units or the interdependence.

It is to be noted that the terms "one" and "more" disclosed in the present disclosure are exemplary rather than restrictive. Those skilled in the art should understand that the above terms are to be read as "one or more" unless indicated otherwise in the context.

Names of the messages or information exchanged between a plurality of apparatuses in the implementations of the present disclosure are provided only for explanatory purpose, rather than restricting the scope of the messages or information.

As described above, with the advance of computer technology, multi-dimensional tables with complex structure, such as collaborative database tables and the like, have become more pervasive. In order to satisfy scenario needs, nested computation of related data between database tables are more commonly dependent on calculation formulae. For example, as to the calculation formula A, related data in nested tables 1, 2 and 3 may be employed for computation. In related art, when a calculation formula with complicated nesting relation is to be used, e.g., the table data corresponding to the calculation formula include modifications to the data within the table cells, it is required to determine all table cells associated with the calculation formula and match the table cells in which data modifications occur one by one to see if they belong to all data cells associated with the calculation formula. This however leads to huge recalculation costs of the calculation formula.

To address the above problems, the embodiments of the present disclosure provide a method for processing table data. Compared with the prior art, the technical scheme provided by the embodiments of the present disclosure has the following advantages: the scheme for processing table data as provided by embodiments of the present disclosure determines at least one target field corresponding to a preset data calculation formula; determines, in response to a data modification operation on a target table, a modification field corresponding to the data modification operation; determines whether the modification field belongs to the at least one target field; determines that the preset data calculation formula meets a preset recalculation condition in case that the modification field belongs to the at least one target field, so as to perform a data recalculation process according to the preset data calculation formula. This technical scheme can quickly determine whether a recalculation of the calculation formula may be resulted from the modification of table data. If the recalculation of the calculation formula occurs, the scheme can quickly locate the changed fields, thereby the recalculation efficiency of the calculation formula can be improved and the costs related to the recalculation of the calculation formula can be reduced.

Before explanation is made, nouns involved in the embodiments of the present disclosure are interpreted first with reference to FIG. 1:

Table: table may be an online multi-dimensional table collaboratively edited by many people and data in the table may be online edited in real time, wherein FIG. 1 is a possible example of the table.

Field: each table may include a plurality of fields. For instance, in FIG. 1, each column may be considered as one field, i.e., Field0, Field1, Field2 and the like are all fields, wherein the field may be of basic types, such as text, date, number and option etc., in some application scenarios, or may be other calculation fields such as formula field etc.

Record: each table may include a plurality of records and each record contains a plurality of fields. For example, in FIG. 1, each row may be regarded as one record, i.e., Record0, Record1 and RecordN−1 are all records.

Table cell: the minimum constituent cell of each table may be regarded as table cell and each record correspondingly stores a table cell value of a table cell corresponding to respective fields, wherein cell may be considered as table cell in FIG. 1, wherein a table cell identification may be composed of a record identification and a field identification of each table cell in the table. For instance, the table cell identification corresponding to the table cell 'cell' is cell (r1, f1) in the drawings, wherein r1 may be considered as record identification of the table cell 'cell' and f1 may be viewed as the field identification of the table cell 'cell'.

Data calculation formula: the multi-dimensional table usually contains two types of data calculation formulae, respectively being in-table calculation formula and cross-table calculation formula, wherein calculation fields involved in the in-table calculation formula are within one same table, while the calculation fields concerned with the cross-table calculation formula are in different tables.

The method is to be introduced below with reference to specific embodiments.

FIG. 2 is a schematic flowchart of a method for processing table data provided by embodiments of the present disclosure. The method may be implemented by an apparatus for processing table data, which apparatus may be implemented by software and/or hardware and generally may be integrated in an electronic device. As shown in FIG. 2, the method comprises:

Step 201: determining at least one target field corresponding to a preset data calculation formula.

In one embodiment of the present disclosure, in order to quickly determine whether the preset data calculation formula needs to be re-calculated, the preset data calculation formula is identified as dependency of field dimension. Each field on which the preset data calculation formula depends may be viewed as the target field.

For example, as shown in FIG. 3, in case that the preset data calculation formula is computed column=T0F1*TNF0*TNFN (where 'computed column represents the preset data calculation formula 1, T indicates the Table and F denotes the Field), the fields on which the calculation formula depends are Field1 in Table0, and Field0 and FieldN in TableN.

It is to be explained that the approach for determining at least one target field corresponding to the preset data calculation formula changes in different application scenarios. Examples are provided below for explanation:

In some possible examples, as shown in FIG. 4, determining at least one target field corresponding to a preset data calculation formula comprises:

Step 401: determining at least one table identification corresponding to the preset data calculation formula and a first field identification corresponding to each of the table identification.

Wherein the table identification may be any information that uniquely identifies the table and the first field identification may be information that uniquely identifies the filed under the corresponding table.

In one embodiment of the present disclosure, the table identification corresponding to each preset data calculation formula is registered while the preset data calculation formula is being registered, so as to determine the table identification corresponding to the preset data calculation formula according to pre-registered information, wherein the first field identification corresponding to the table identification may be obtained through reading the field position corresponding to the table identification, and the first field identification corresponding to each table identification may also be obtained by querying a preset correspondence.

In one embodiment of the present disclosure, to enable a processor to identify tables and fields referred to by the preset data calculation formula, tables are referred to by table reference information and fields are referred to by field reference information in the formula, wherein the table reference information and the field reference information may be set depending on scenario needs. In this embodiment, the corresponding table reference information and field reference information in each preset data calculation formula may be identified. The corresponding table identification is determined according to the table reference information and the corresponding first field identification is determined in view of the field reference information. For instance, in case that the preset data calculation formula is {Student Table}.Field(CurrentValue.{Grade}="third grade" && Current Value.{Score}=100).{Student ID}, the corresponding table identification is determined as "student table" according to the table reference information "{ }" and the first field identification is determined as "grade", "score" and "student ID" in view of the field reference information (i.e., { } following Field).

Step 402: determining a second field identification in a table corresponding to each of the table identification.

In one embodiment of the present disclosure, the second field identification corresponding to each table identification in the table is determined, wherein the second field identification is the field identification of all fields contained in the table corresponding to each table identification. In some possible embodiments, the table field name corresponding to each table identification may be read to obtain the second field identification. In some possible embodiments, the second field identification corresponding to the table identification may be determined by querying the preset correspondence.

Step 403: matching the second field identification with a first field identification of a corresponding table, and determine a field corresponding to a successfully matched second field identification as the target field.

In one embodiment of the present disclosure, the second field identification matches with the first field identification of the corresponding table to determine the field corresponding to the successfully matched second field identification as the target field. In other words, the target field is the second field identification in the table contained in the preset data calculation formula.

In some possible examples, table keywords contained in the preset data calculation formula and field keywords corresponding to the table keywords may also be identified. A field name base corresponding to the table keywords is queried according to the field keywords, wherein the field name base contains all field names in the table corresponding to the table keywords, and fields corresponding to the field names successfully matching the field keywords in the field name base are determined as target fields.

Step 202: determining, in response to a data modification operation on a target table, a modification field corresponding to the data modification operation.

It may be easily understood that data in table cells of the table are editable. In such case, a modification operation may be performed on the data in the table cells. For example, a teacher may modify "Xiao Ming's score of Chinese" in the table of score of students.

In the embodiments of the present disclosure, in order to quickly determine whether the data modification operation would affect calculation of the preset calculation formula, the modification field corresponding to the data modification operation is determined in response to the data modification operation on the target table. Accordingly, it is quickly determined in the dimension of field whether the preset data calculation formula is affected. The number of table cells modified by the data modification operation may be one or plural, and the corresponding modification field may also be one or plural.

It is to be explained that the approach for determining the modification field corresponding to the data modification operation changes in different application scenarios. Examples are provided below for explanation:

In some possible examples, the modification table cells corresponding to the data modification operation are determined and the fields corresponding to the modification table cells are determined as modification fields. For instance, if the table is as shown in FIG. 1, the modification field may be determined by querying the column where the preset modification table cell is positioned. The modification table cells are denoted by the gray area in the figure.

In some possible examples, to further enhance table modification efficiency, the first number of field types corresponding to the data modification operation may also be determined, i.e., the number of field type correspondingly modified by the data modification operation is aggregated to determine the second number of field types contained in each record of the target table, wherein the second number of field types contained in each record is a total number of field type included in the target table. In case that the first number of field types is greater than that of the second field type, all fields contained in each record are directly determined as modification fields. Therefore, the modification fields are determined merely by quantity comparison and the efficiency for determining the modification field is enhanced.

For example, as shown in FIG. 5, when the second number of field types corresponding to each record contained in the target table is 4 (gray area in the figure), the first number of field types corresponding to the data modification operation is also 4. This indicates that all fields contained in the table are subject to data modification. Therefore, all fields contained in each record are determined as modification fields.

Step 203: determining whether the modification field belongs to the at least one target field.

Step 204: determining that the preset data calculation formula meets a preset recalculation condition in case that the modification field belongs to the at least one target field, so as to perform a data recalculation process according to the preset data calculation formula.

In one embodiment of the present disclosure, after the modification field is determined, it is further decided whether the modification field belongs to at least one target field, i.e., a determination as to whether the preset data formula is affected is made in field dimension without comparing the table cells one by one. Accordingly, upon modification of table data, it is quickly pinpointed whether a recalculation of the calculation formula would incur. In case of recalculation of the calculation formula, the changed fields are rapidly positioned.

In this embodiment, if the modification field belongs to the at least one target field, it is determined that the preset data calculation formula meets the preset recalculation condition, i.e., a corresponding calculation result of the preset data calculation formula will be affected by this data modification operation and a data recalculation process is required. In this embodiment, the preset data calculation formula that would be affected by this data modification operation is quickly located on the basis of field dimension, to facilitate a quick update of the calculation result.

In some possible examples, to quickly determine that the calculation result corresponding to the preset data calculation formula is affected by this data modification operation, a tree structure is built according to the target field on which the preset data calculation formula depends. The tree structure is built with the table associated with the preset data calculation formula as the parent node and the target field as the child node. In such case, it is rapidly determined whether the data modification operation affects the calculation result of the preset data calculation formula through comparison of the child nodes in the tree structure.

In this embodiment, the parent nodes is built according to each table corresponding to the preset data calculation formula, on the basis of the influence of the data modification operation on the calculation result corresponding to the preset data calculation formula, in view of a correspondence between tables and target fields corresponding to the preset data calculation formula, a tree structure corresponding to the parent nodes and the child nodes is established.

Figure 6:
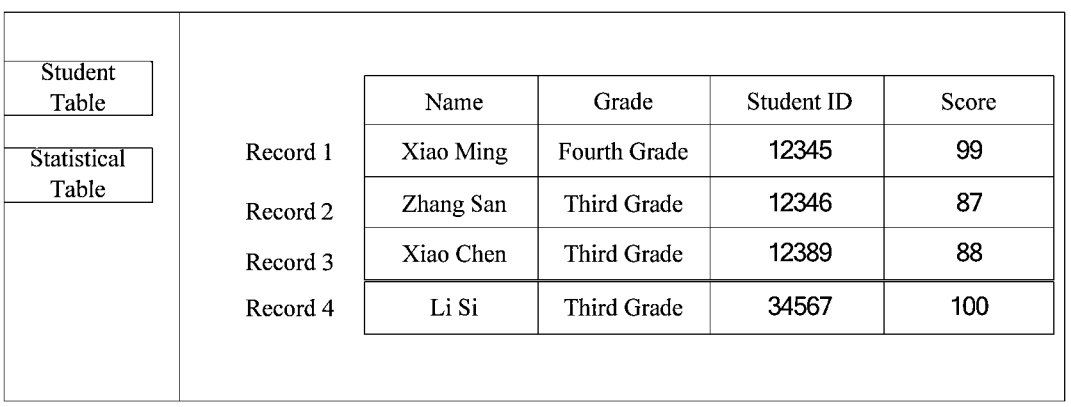
FIG. 6 illustrates a schematic diagram of a further table structure provided by embodiments of the present application.
Figure 7:
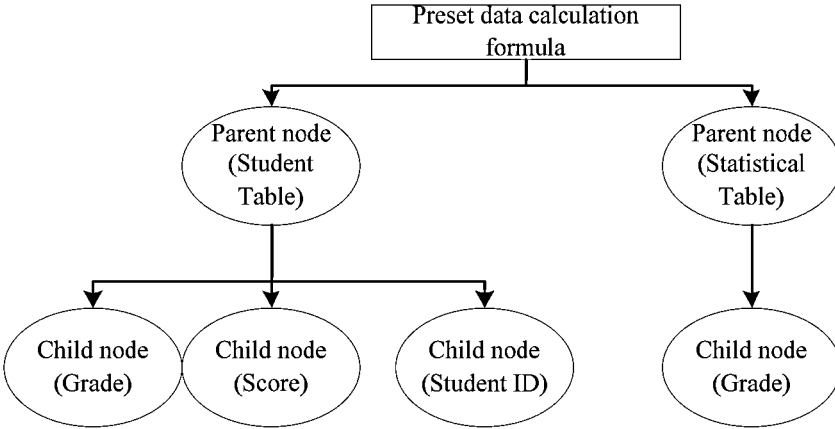
FIG. 7 illustrates a schematic diagram of a processing scenario for table data provided by the embodiments of the present application.

For example, if the preset data calculation formula depends on "Student Table" and "Statistical Table", wherein the target fields corresponding to "Student Table" are "Grade", "Student ID" and "Score" as shown in FIG. 6 and the target field corresponding to "Statistical Table" is "Grade", the tree structure of the preset data calculation formula is as demonstrated in FIG. 7, in which the tree structure includes two parent nodes, i.e., "Student Table" and "Statistical Table" according to FIG. 7. The target field contained in "Student Table" corresponds to the child nodes "Grade", "Student ID" and "Score". The target field contained in "Statistical Table" corresponds to the child node "Grade". When changes occur to the data corresponding to any one target field, the calculation result of the preset data calculation formula will be affected, leading to recalculation of the preset data calculation formula.

In one embodiment of the present disclosure, the child node in the tree structure may match with the modification field. On the basis of the matching result, it is determined whether a target child node corresponding to the modification field exists in the tree structure. In case that the target child node exists, it is determined that the modification field belongs to the at least one target field.

As an example, when Record 2 in "Student Table" as shown in FIG. 6 is deleted, it may be directly determined that the modification field corresponding to the deletion operation is "Score" and the corresponding target child node is "Score". This should not be described as "the table cell ** corresponding to Record 2 is deleted". Accordingly, the data modification operation may be depicted as modification on "target child node" and the determination as to whether a recalculation is required for the preset calculation formula can be made more efficiently.

Figure 8:
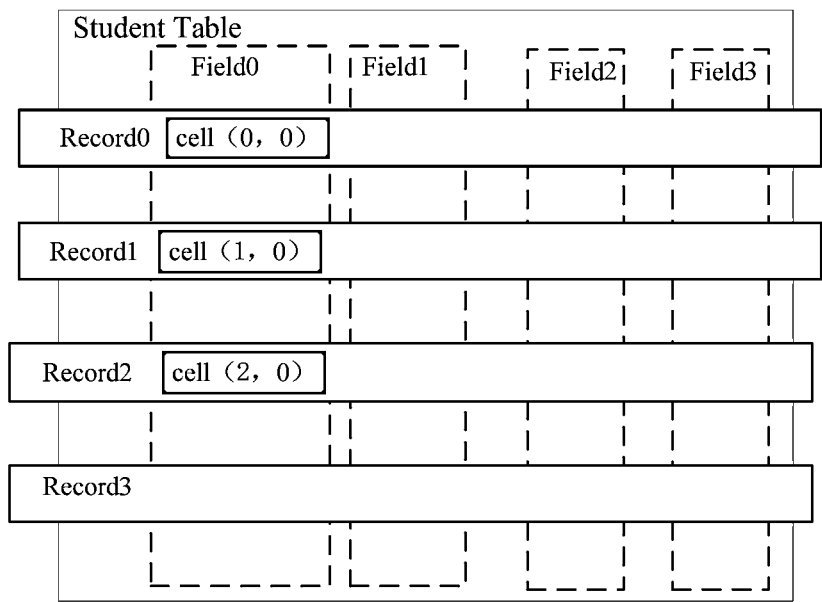
FIG. 8 illustrates a schematic diagram of a further table structure provided by embodiments of the present application.

For another example, according to FIG. 8, in case that score values of table cells ("cell (0, 0)", "cell (1, 0)" and "cell (2, 0)") corresponding to score field in "Student Table" are all modified, tables contained in the preset calculation formula are determined in the first place and then the target fields included in the table are determined. Moreover, the table cells comprised in the target fields are also determined. After iteratively determining the table cells included in the target fields as stated above, matching is performed three times in the end to see whether the table cells involved in the preset data calculation formula contain these modified table cells. In the embodiments of the present disclosure, the above modification operation is no longer described as "modifications occur to "cell (0, 0)", "cell (1, 0)" and "cell (2, 0)"". Instead, this modification is depicted as "the field 'Score' is a modification field". In such case, the modification operation is described in the dimension of field, so is the preset calculation formula. Therefore, it is only required to determine whether the modification field "Score" belongs to the target field of the preset data calculation formula, thereby the comparison costs are reduced, and the computing power consumption is greatly reduced.

In one embodiment of the present disclosure, after it is determined that the preset data calculation formula meets the preset recalculation condition, the data recalculation process also may be performed according to the preset data calculation formula. That is, in this embodiment, a modification table cell identification corresponding to the modification field and the modified first data (wherein the modification table cell identification may be sent along with the data modification operation information, or after the preset data calculation formula meets the preset recalculation condition, the modification table cell identification corresponding to the data modification operation is determined in response to obtaining a recalculation confirm operation) are obtained, wherein the modification table cell identification may be composed of a record identification and a field identification of the modification table cell in the corresponding table (i.e., composed of row number and column number in the table).

Furthermore, a non-modification table cell identification corresponding to a non-modification field in the preset data calculation formula is determined according to the modification table cell identification. For example, in case that the non-modification field includes a first non-modification field belonging to the same table as the modification field, a record in which the first non-modification field is located is determined according to the modification table cell identification and the cell identification of the first non-modification field in the corresponding record is identified as the non-modification table cell identification.

As an example, if the preset data calculation formula is to gain "a sum of Chinese score and Math score for each student in table Q1" and the modification table cell identification corresponds to the table cell of "Chinese score" under the record of "Zhang San" in Q1, the cell identification of the "Math" table cell which is not modified under the record of "Zhang San" is determined as the non-modification table cell identification.

For instance, in case that the non-modification field includes a second non-modification field that belongs to a different table than the modification field, correlation information between different tables is determined according to the modification table cell identification, wherein the correlation information is configured per scenario requirements and may locate the specific record in a corresponding table. In the corresponding record, the table cell identification of the second non-modification field corresponding to the correlation information is determined as the non-modification table cell identification.

As an example, if the formula is to gain "a sum of Chinese score of each student in table Q1 and English score of each student in Q2", the correlation information includes student name field contained in Q1 and student name field contained in Q2. When the modification table cell identification corresponds to the table cell of "Chinese score" under the record of "Zhang San" in Q1, the cell identification of the "English" table cell which is not modified under the corresponding record of "Zhang San" in Q2 is determined as the non-modification table cell identification.

In the embodiments of the present disclosure, a modification table cell identification corresponding to the modification field and modified first data are obtained; according to the modification table cell identification, a non-modification table cell identification corresponding to a non-modification field in the preset data calculation formula is determined and second data corresponding to the non-modification table cell identification are obtained; the first data and the second data are calculated according to the preset data calculation formula to obtain a recalculation result. Since the determination as to whether a recalculation occurs to the preset data calculation formula is made in the field dimension, it can more efficiently determine whether the recalculation is to be performed on the preset data calculation formula. Furthermore, the recalculation efficiency of the preset data calculation formula is improved.

In summary, the method for processing table data according to embodiments of the present disclosure comprises: determining at least one target field corresponding to a preset data calculation formula; determining, in response to a data modification operation on a target table, a modification field corresponding to the data modification operation; determining whether the modification field belongs to the at least one target field; and determining that the preset data calculation formula meets a preset recalculation condition in case that the modification field belongs to the at least one target field, so as to perform a data recalculation process according to the preset data calculation formula. This technical scheme can quickly determine whether a recalculation of the calculation formula may be resulted from the modification of table data. If the recalculation of the calculation formula occurs, the scheme can quickly locate the changed fields, thereby the recalculation efficiency of the calculation formula is improved and the costs related to the recalculation of the calculation formula are reduced.

Figure 9:
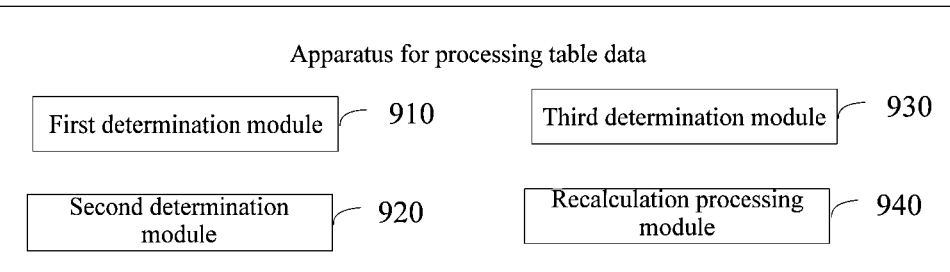
FIG. 9 illustrates a structural diagram of an apparatus for processing table data provided by the embodiments of the present disclosure.

To implement the above embodiments, the present disclosure also proposes an apparatus for processing table data. FIG. 9 is a structural diagram of the apparatus for processing table data provided by embodiments of the present disclosure, which apparatus may be implemented by software and/or hardware and may generally be integrated in an electronic device for table data processing. As shown in FIG. 9, the apparatus comprises: a first determination module 910, a second determination module 930 and a third determination module 930 and a recalculation processing module 940, wherein, a first determination module 910 is configured to determine at least one target field corresponding to a preset data calculation formula;

a second determination module 920 is configured to determine, in response to a data modification operation on a target table, a modification field corresponding to the data modification operation;

a third determination module 930 is configured to determine whether the modification field belongs to the at least one target field;

a recalculation processing module 940 is configured to determine that the preset data calculation formula meets a preset recalculation condition in case that the modification field belongs to the at least one target field, so as to perform a data recalculation process according to the preset data calculation formula.

The apparatus for processing table data provided by embodiments of the present disclosure may implement the method for processing table data according to any embodiments of the present disclosure, include corresponding functional modules for performing the method and achieve corresponding advantageous effects.

To fulfill the above embodiments, the present disclosure also provides a computer program product comprising computer programs/instructions, the computer programs/instructions, when executed by the processor, implement the method for processing table data in the above embodiments.

Figure 10:
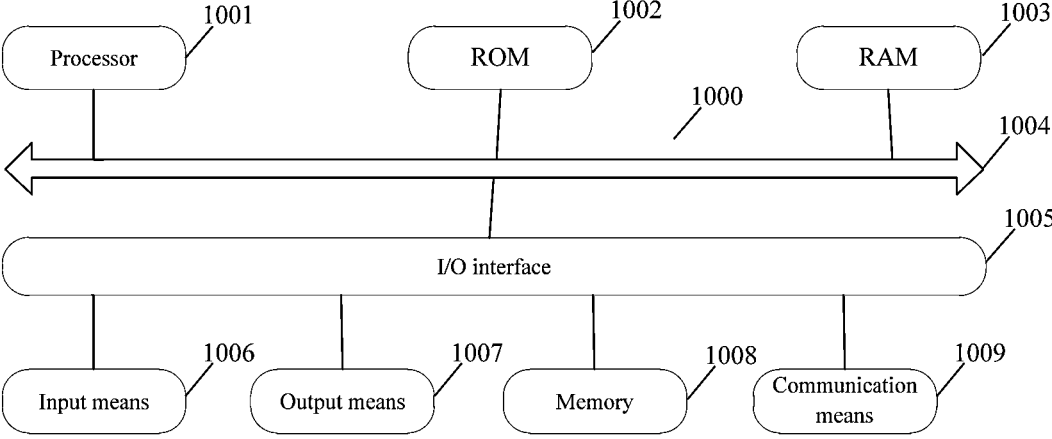
FIG. 10 illustrates a structural diagram of an electronic device provided by the embodiments of the present disclosure.

FIG. 10 illustrates a structural diagram of an electronic device provided by the embodiments of the present disclosure.

Specifically, with reference to FIG. 10, a structural diagram of an electronic device 1000 adapted to implement embodiments of the present disclosure is shown. In the embodiments of the present disclosure, the electronic device 1000 in the embodiments of the present disclosure may include, but not limited to, mobile terminals, such as mobile phones, notebooks, digital broadcast receivers, PDAs (Personal Digital Assistant), PADs (tablet computer), PMPs (Portable Multimedia Player) and vehicle terminals (such as car navigation terminal) and fixed terminals, e.g., digital TVs and desktop computers etc. The electronic device shown in FIG. 10 is just an example and will not put any restrictions on the functions and application ranges of the embodiments of the present disclosure.

According to FIG. 10, the electronic device 1000 may include a processor (e.g., central processor, graphic processor and the like) 1001, which can execute various suitable actions and processing based on the programs stored in the read-only memory (ROM) 1002 or programs loaded in the random-access memory (RAM) 1003 from a memory 1008. The RAM 1003 can also store all kinds of programs and data required by the operations of the electronic device 1000. Processor 1001, ROM 1002 and RAM 1003 are connected to each other via a bus 1004. The input/output (I/O) interface 1005 is also connected to the bus 1004.

Usually, Input means 1006 (including touch screen, touchpad, keyboard, mouse, camera, microphone, accelerometer, gyroscope and like) and Output means 1007 (including liquid crystal display (LCD), speaker and vibrator etc.), memory 1008 (including tape and hard disk etc.) and Communication means 1009 may be connected to the I/O interface 1005. The Communication means 1009 may allow the electronic device 1000 to exchange data with other devices through wired or wireless communications. Although FIG. 10 illustrates the electronic device 1000 having various units, it is to be understood that it is not a prerequisite to implement or provide all illustrated units. Alternatively, more or less units may be implemented or provided.

In particular, according to embodiments of the present disclosure, the process depicted above with reference to the flowchart may be implemented as computer software programs. For example, the embodiments of the present disclosure include a computer program product including computer programs carried on a non-transient computer readable medium, wherein the computer programs include program codes for executing the method demonstrated by the flowchart. In these embodiments, the computer programs may be loaded and installed from networks via the Communication means 1009, or installed from the memory 1008, or installed from the ROM 1002. The computer programs, when executed by the processor 1001, performs the above functions defined in the method for video editing according to the embodiments of the present disclosure.

It is to be explained the above disclosed computer readable medium may be computer readable signal medium or computer readable storage medium or any combinations thereof. The computer readable storage medium for example may include, but not limited to, electric, magnetic, optical, electromagnetic, and infrared or semiconductor systems, apparatus or devices or any combinations thereof. Specific examples of the computer readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof. In the present disclosure, the computer readable storage medium may be any tangible medium that contains or stores programs. The programs may be utilized by instruction execution systems, apparatuses or devices in combination with the same. In the present disclosure, the computer readable signal medium may include a data signal propagated in baseband or as part of a carrier wave, carrying computer readable program codes therein. Such propagated data signals may take many forms, including but not limited to, electromagnetic signals, optical signals, or any suitable combinations thereof. The computer readable signal medium may also be any computer readable medium in addition to the computer readable storage medium. The computer readable signal medium may send, propagate, or transmit programs for use by or in connection with instruction execution systems, apparatuses or devices. Program codes contained on the computer readable medium may be transmitted by any suitable media, including but not limited to: electric wires, fiber optic cables and RF (radio frequency) etc., or any suitable combinations thereof.

In some implementations, clients and servers may communicate with each other via any currently known or to be developed network protocols, such as HTTP (HyperText Transfer Protocol) and interconnect with digital data communications in any forms or media (such as communication networks). Examples of the communication networks include Local Area Network (LAN), Wide Area Network (WAN), internet work (e.g., Internet) and end-to-end network (such as ad hoc end-to-end network), and any currently known or to be developed networks.

The above computer readable medium may be included in the aforementioned electronic device or stand-alone without fitting into the electronic device.

The above computer readable medium bears one or more programs. When the above one or more programs are executed by the electronic device, the electronic device is enabled to:
determine at least one target field corresponding to a preset data calculation formula; determine, in response to a data modification operation on the target table, a modification field corresponding to the data modification operation; determine whether the modification field belongs to the at least one target field; in case that the modification field belongs to the at least one target field, determine that the preset data calculation formula meets a preset recalculation condition, so as to perform a data recalculation process according to the preset data calculation formula. This technical scheme can quickly determine whether a recalculation of the calculation formula may be resulted from the modification of table data. If the recalculation of the calculation formula occurs, the scheme can quickly locate the changed fields, which improves the recalculation efficiency of the calculation formula and lowers the costs related to the recalculation of the calculation formula.

The electronic device may write computer program instructions for executing operations of the present disclosure in one or more programming languages or combinations thereof. The above programming languages include, but not limited to, object-oriented programming languages, e.g., Java, Smalltalk, C++ and so on, and traditional procedural programming languages, such as "C" language or similar programming languages. The program codes can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider).

The flow chart and block diagram in the drawings illustrate system architecture, functions and operations that may be implemented by system, method and computer program product according to various implementations of the present disclosure. In this regard, each block in the flow chart or block diagram can represent a module, a part of program segment or code, wherein the module and the part of program segment or code include one or more executable instruction for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Units described in the embodiments of the present disclosure may be implemented by software or hardware. In some cases, the name of the unit should not be considered as the restriction over the unit per se.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In the context of the present disclosure, machine readable medium may be tangible medium that may include or store programs for use by or in connection with instruction execution systems, apparatuses or devices. The machine readable medium may be machine readable signal medium or machine readable storage medium. The machine readable storage medium for example may include, but not limited to, electric, magnetic, optical, electromagnetic, infrared or semiconductor systems, apparatus or devices or any combinations thereof. Specific examples of the machine readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof.

The above description only explains the preferred embodiments of the present disclosure and the technical principles applied. Those skilled in the art should understand that the scope of the present disclosure is not limited to the technical scheme resulted from particular combinations of the above technical features, and meanwhile should also encompass other technical schemes formed from any combinations of the above technical features or equivalent features without deviating from the above disclosed inventive concept, such as the technical schemes formed by substituting the above features with the technical features disclosed here with similar functions.

Furthermore, although the respective operations are depicted in a particular order, it should be appreciated that the operations are not required to be completed in the particular order or in succession. In some cases, multitasking or multiprocessing is also beneficial. Likewise, although the above discussion comprises some particular implementation details, they should not be interpreted as limitations over the scope of the present disclosure. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter is already described by languages specific to structural features and/or method logic acts, it is to be appreciated that the subject matter defined in the attached claims is not limited to the above described particular features or acts. On the contrary, the above described particular features and acts are only example forms for implementing the claims.

We claim:
1. A method for processing table data, comprising:
determining, by a processor coupled to a memory, at least one target field corresponding to a preset data calculation formula;
determining, by the processor and in response to a data modification operation on a target table, a modification field corresponding to the data modification operation;
determining, by the processor, whether the modification field belongs to the at least one target field in a table that is stored in a collaborative database corresponding to the preset data calculation formula; and
determining, by the processor, that the preset data calculation formula meets a preset recalculation condition in case that the modification field belongs to the at least one target field, so as to perform a data recalculation process according to the preset data calculation formula; and
updating a calculation result in the collaborative database, wherein determining the modification field corresponding to the data modification operation comprises:

determining a first number of field types corresponding to the data modification operation;
determining a second number of field types contained in each record corresponding to the target table; and
determining all fields contained in the each record as the modification field in case that the first number of the field types is greater than or equal to the second number of the field types.
2. The method of claim 1, wherein determining the at least one target field corresponding to the preset data calculation formula comprises:
determining at least one table identification corresponding to the preset data calculation formula and a first field identification corresponding to each of the table identification;
determining a second field identification in a table corresponding to each of the table identification; and
determining a field corresponding to a successfully matched second field identification as the target field by matching the second field identification with a first field identification of a corresponding table identification.
3. The method of claim 1, wherein determining the modification field corresponding to the data modification operation comprises:
determining a modification table cell corresponding to the data modification operation; and
determining a field corresponding to the modification table cell as the modification field.
4. The method of claim 1, wherein before determining whether the modification field belongs to the at least one target field, the method comprises:
building a parent node according to each table corresponding to the preset data calculation formula;
building a child node according to each target field corresponding to the preset data calculation formula; and
building a tree structure corresponding to the parent node and the child node according to a correspondence between tables and target fields corresponding to the preset data calculation formula.
5. The method of claim 4, wherein determining whether the modification field belongs to the at least one target field comprises:
matching a child node in the tree structure with the modification field, and determining, according to a matching result, whether a target child node corresponding to the modification field exists in the tree structure; and
determining that the modification field belongs to the at least one target field in case that the target child node exists.
6. The method of claim 1, wherein performing the data recalculation process according to the preset data calculation formula further comprises:
obtaining a modification table cell identification corresponding to the modification field and modified first data;
determining, according to the modification table cell identification, a non-modification table cell identification corresponding to a non-modification field in the preset data calculation formula, and obtaining second data corresponding to the non-modification table cell identification; and
obtaining a recalculated calculation result by calculating the first data and the second data according to the preset data calculation formula.

7. An electronic device, comprising:

a processor;

a memory configured to store instructions executable by the processor;

wherein the processor is configured to read the executable instructions from the memory, and the instructions, when executed by the processor, causes the processor to:

determine at least one target field corresponding to a preset data calculation formula;

determine, in response to a data modification operation on a target table, a modification field corresponding to the data modification operation;

determine whether the modification field belongs to the at least one target field in a table that is stored in a collaborative database corresponding to the preset data calculation formula; and determine that the preset data calculation formula meets a preset recalculation condition in case that the modification field belongs to the at least one target field, so as to perform a data recalculation process according to the preset data calculation formula; and update a calculation result in the collaborative database, wherein the instructions causing the processor to determine the modification field corresponding to the data modification operation comprise instructions causing the processor to:

determine a first number of field types corresponding to the data modification operation;

determine a second number of field types contained in each record corresponding to the target table; and determine all fields contained in the each record as the modification field in case that the first number of the field types is greater than or equal to the second number of the field types.

8. The device of claim 7, wherein the instructions causing the processor to determine the at least one target field corresponding to the preset data calculation formula comprise instructions causing the processor to:

determine at least one table identification corresponding to the preset data calculation formula and a first field identification corresponding to each of the table identification;

determine a second field identification in a table corresponding to each of the table identification; and determine a field corresponding to a successfully matched second field identification as the target field by matching the second field identification with a first field identification of a corresponding table identification.

9. The device of claim 7, wherein the instructions causing the processor to determine the modification field corresponding to the data modification operation comprise instructions causing the processor to:

determine a modification table cell corresponding to the data modification operation; and determine a field corresponding to the modification table cell as the modification field.

10. The device of claim 7, wherein before determining whether the modification field belongs to the at least one target field, the instructions further causes the processor to:

build a parent node according to each table corresponding to the preset data calculation formula;

build a child node according to each target field corresponding to the preset data calculation formula; and build a tree structure corresponding to the parent node and the child node according to a correspondence between tables and target fields corresponding to the preset data calculation formula.

11. The device of claim 10, wherein the instructions causing the processor to determine whether the modification field belongs to the at least one target field comprise instructions causing the processor to:

match a child node in the tree structure with the modification field, and determine, according to a matching result, whether a target child node corresponding to the modification field exists in the tree structure; and determine that the modification field belongs to the at least one target field in case that the target child node exists.

12. The device of claim 7, wherein the instructions causing the processor to perform the data recalculation process according to the preset data calculation formula further comprise instructions causing the processor to:

obtain a modification table cell identification corresponding to the modification field and modified first data;

determine, according to the modification table cell identification, a non-modification table cell identification corresponding to a non-modification field in the preset data calculation formula, and obtain second data corresponding to the non-modification table cell identification; and obtain a recalculated calculation result by calculating the first data and the second data according to the preset data calculation formula.

13. A non-transitory computer-readable storage medium, wherein the computer-readable storage medium stores a computer program, the computer program is configured to:

determine at least one target field corresponding to a preset data calculation formula;

determine, in response to a data modification operation on a target table, a modification field corresponding to the data modification operation;

determine whether the modification field belongs to the at least one target field in a table that is stored in a collaborative database corresponding to the preset data calculation formula; and determine that the preset data calculation formula meets a preset recalculation condition in case that the modification field belongs to the at least one target field, so as to perform a data recalculation process according to the preset data calculation formula; and update a calculation result in the collaborative database, wherein the computer program configured to determine the modification field corresponding to the data modification operation is further configured to:

determine a first number of field types corresponding to the data modification operation;

determine a second number of field types contained in each record corresponding to the target table; and determine all fields contained in the each record as the modification field in case that the first number of the field types is greater than or equal to the second number of the field types.

14. The medium of claim 13, wherein the computer program configured to determine the at least one target field corresponding to the preset data calculation formula is further configured to:

determine at least one table identification corresponding to the preset data calculation formula and a first field identification corresponding to each of the table identification;

determine a second field identification in a table corresponding to each of the table identification; and determine a field corresponding to a successfully matched second field identification as the target field by matching the second field identification with a first field identification of a corresponding table identification.

15. The medium of claim 13, wherein the computer program configured to determine the modification field corresponding to the data modification operation is further configured to:

determine a modification table cell corresponding to the data modification operation; and determine a field corresponding to the modification table cell as the modification field.

16. The medium of claim 13, wherein before determining whether the modification field belongs to the at least one target field, the computer program is further configured to:

build a parent node according to each table corresponding to the preset data calculation formula;

build a child node according to each target field corresponding to the preset data calculation formula; and build a tree structure corresponding to the parent node and the child node according to a correspondence between tables and target fields corresponding to the preset data calculation formula.

17. The medium of claim 16, wherein the computer program configured to determine whether the modification field belongs to the at least one target field is further configured to:

match a child node in the tree structure with the modification field, and determine, according to a matching result, whether a target child node corresponding to the modification field exists in the tree structure; and determine that the modification field belongs to the at least one target field in case that the target child node exists.

\* \* \* \* \*